(12) United States Patent
Horikiri et al.

(10) Patent No.: US 10,013,409 B2
(45) Date of Patent: Jul. 3, 2018

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Kazunori Horikiri, Kanagawa (JP); Yuki Nakamori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 8 days.

(21) Appl. No.: 15/140,913

(22) Filed: Apr. 28, 2016

(65) Prior Publication Data

US 2017/0132189 A1    May 11, 2017

(30) Foreign Application Priority Data

Nov. 10, 2015 (JP) ................................ 2015-220194

(51) Int. Cl.
| | | |
|---|---|---|
| G06F 17/00 | (2006.01) | |
| G06F 17/24 | (2006.01) | |
| G06F 17/27 | (2006.01) | |

(52) U.S. Cl.
CPC .......... *G06F 17/241* (2013.01); *G06F 17/246* (2013.01); *G06F 17/2715* (2013.01)

(58) Field of Classification Search
CPC ............................. G06F 17/246; G06F 17/241
See application file for complete search history.

(56) References Cited

U.S. PATENT DOCUMENTS

| | | | | |
|---|---|---|---|---|
| 8,819,617 | B1 * | 8/2014 | Koenig | ..................... G06F 8/70 717/101 |
| 2006/0262995 | A1 * | 11/2006 | Barrus | .............. G06F 17/30716 382/317 |
| 2011/0066933 | A1 * | 3/2011 | Ludwig | ................. G06F 17/246 715/212 |
| 2011/0191688 | A1 * | 8/2011 | Hasegawa | ............... G06F 15/00 715/738 |

FOREIGN PATENT DOCUMENTS

| | | |
|---|---|---|
| JP | 2009-093389 A | 4/2009 |
| JP | 2011-164696 A | 8/2011 |

* cited by examiner

*Primary Examiner* — Andrew T McIntosh
(74) *Attorney, Agent, or Firm* — Oliff PLC

(57) ABSTRACT

An information processing apparatus includes a first specifying unit, a second specifying unit, an extraction unit, a processing unit, and an output unit. The first specifying unit specifies a position of a sticky note attached onto a sheet having a plurality of cells. The second specifying unit specifies at least one of the cells in the sheet based on the position. The extraction unit extracts at least one of a rule related to the position and a rule related to the at least one cell. Both of the rules define (1) how to extract information from the sticky note, and (2) how to process the extracted information. The processing unit extracts information from the sticky note according to the rule extracted by the extraction unit, and processes the information according to the extracted rule. The output unit outputs a processing result of the processing unit onto the sheet.

11 Claims, 22 Drawing Sheets

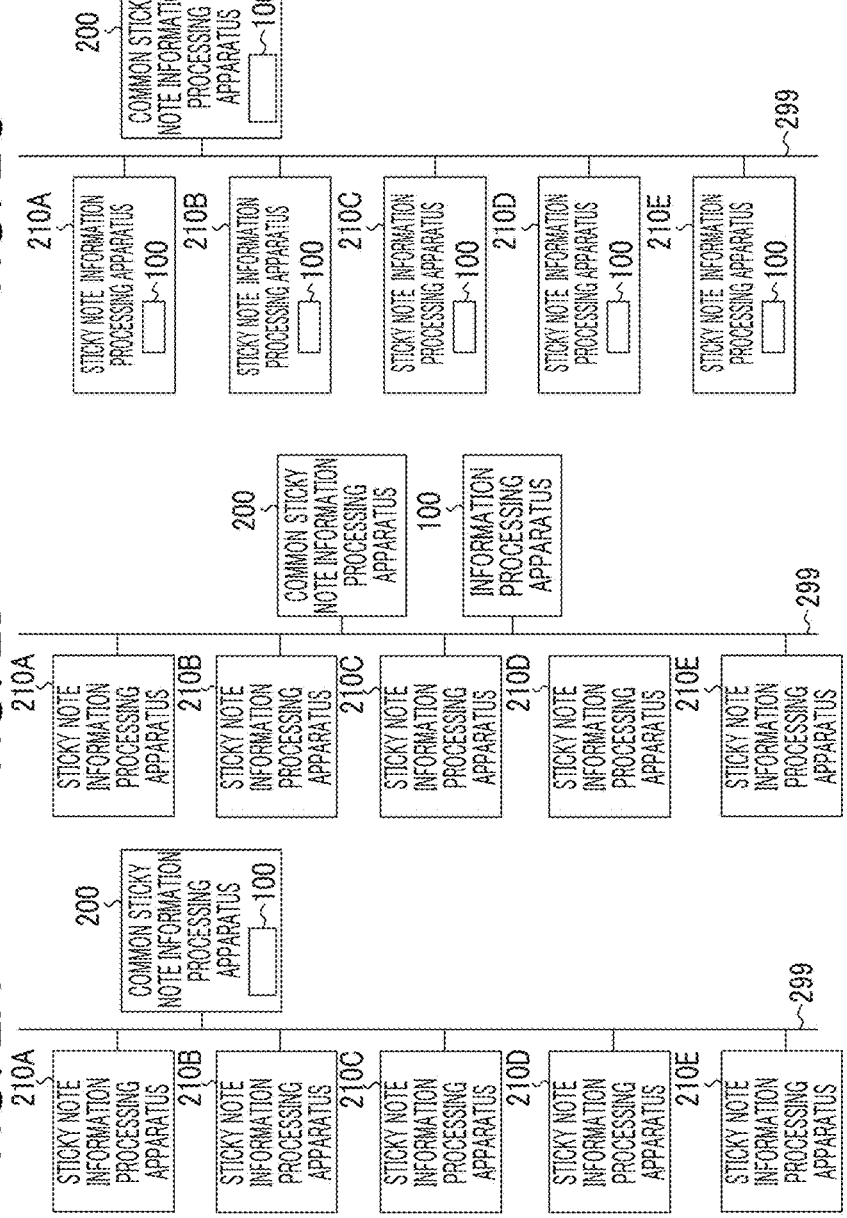

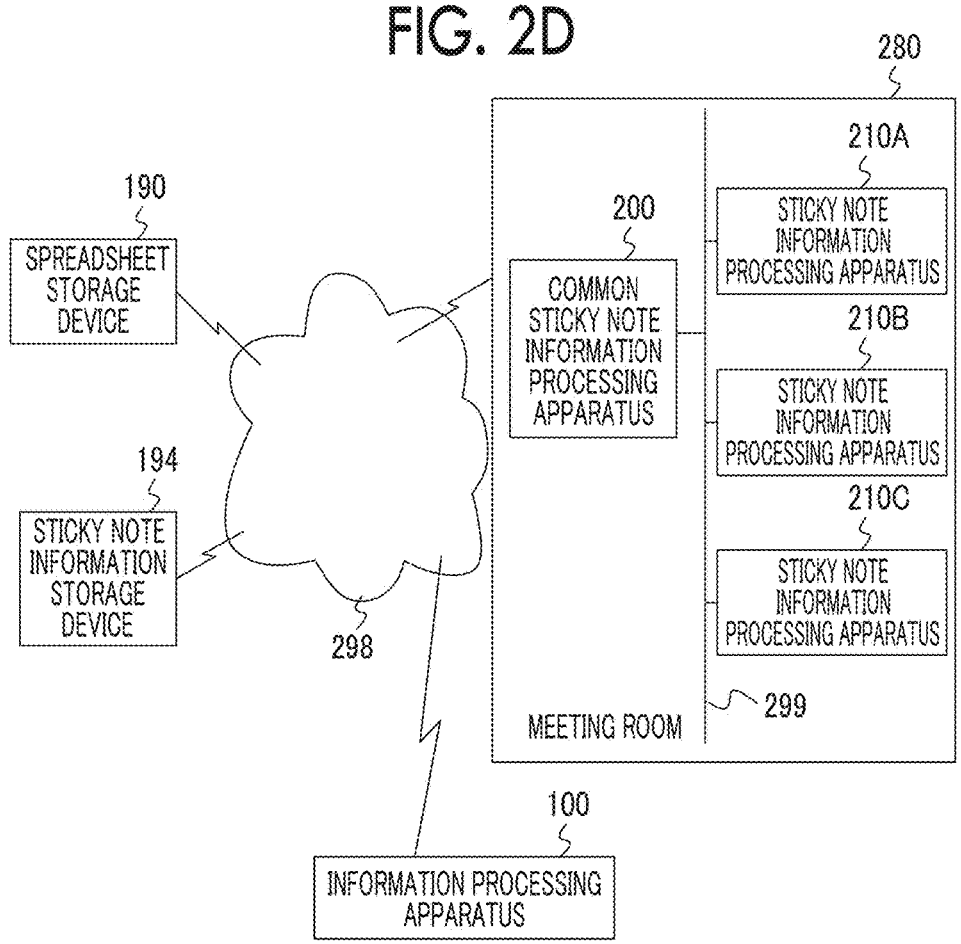

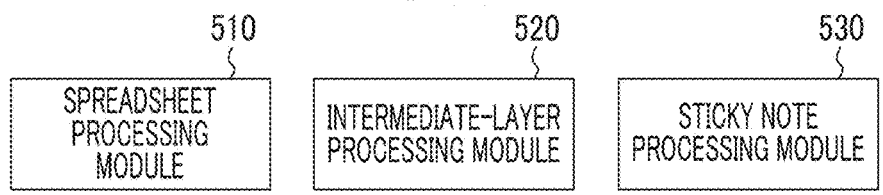
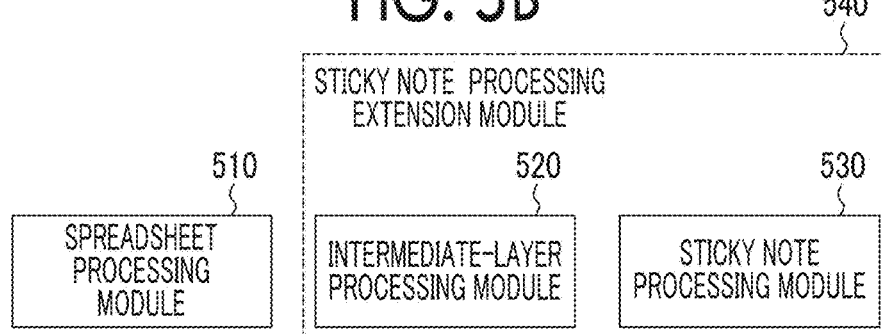
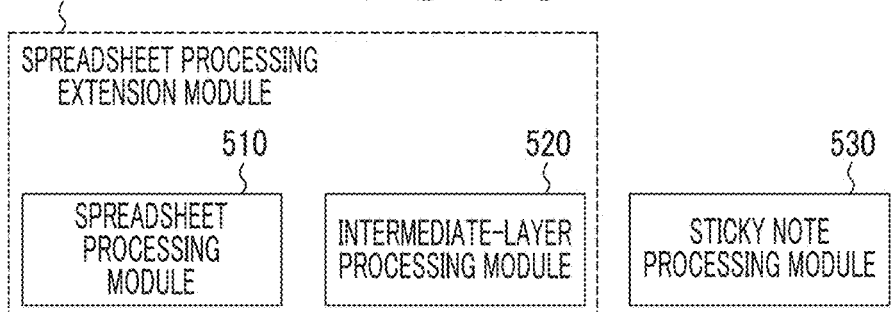
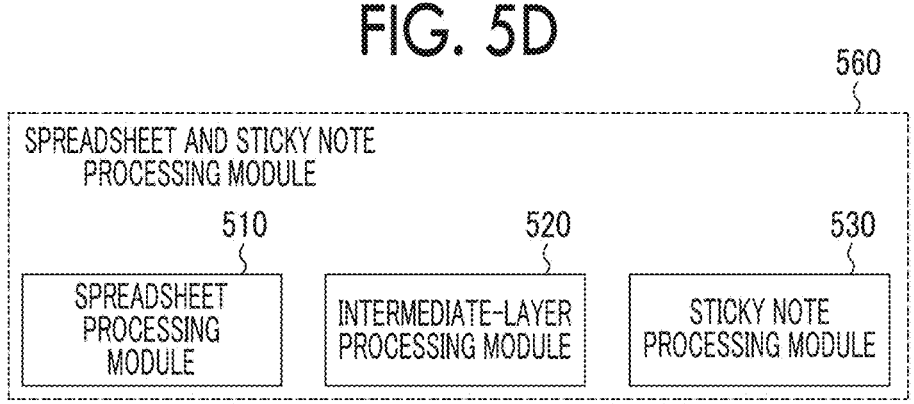

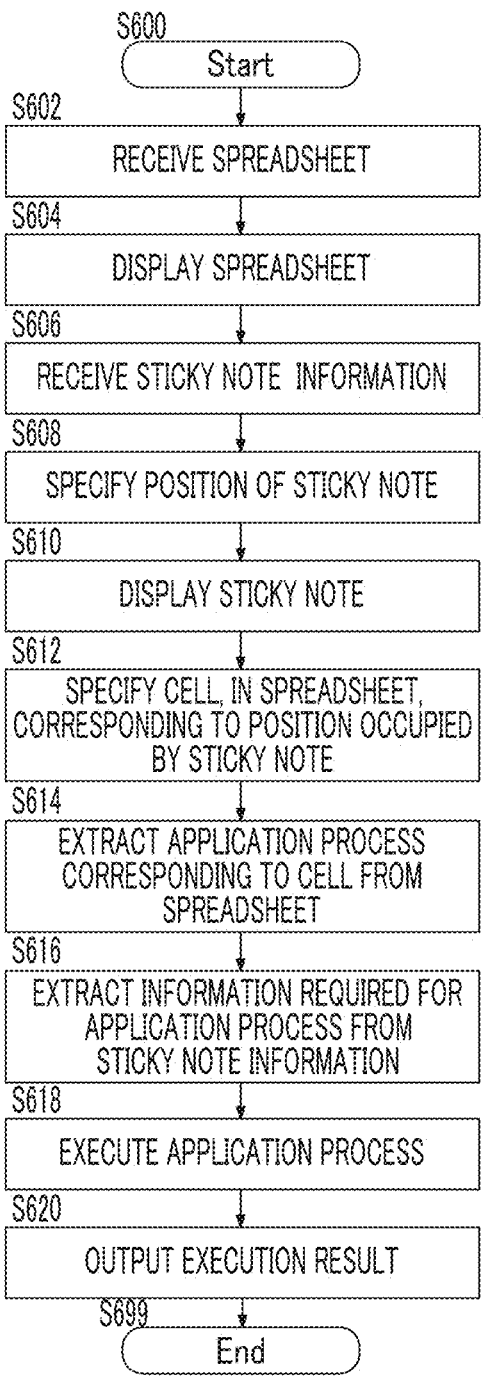

FIG. 8

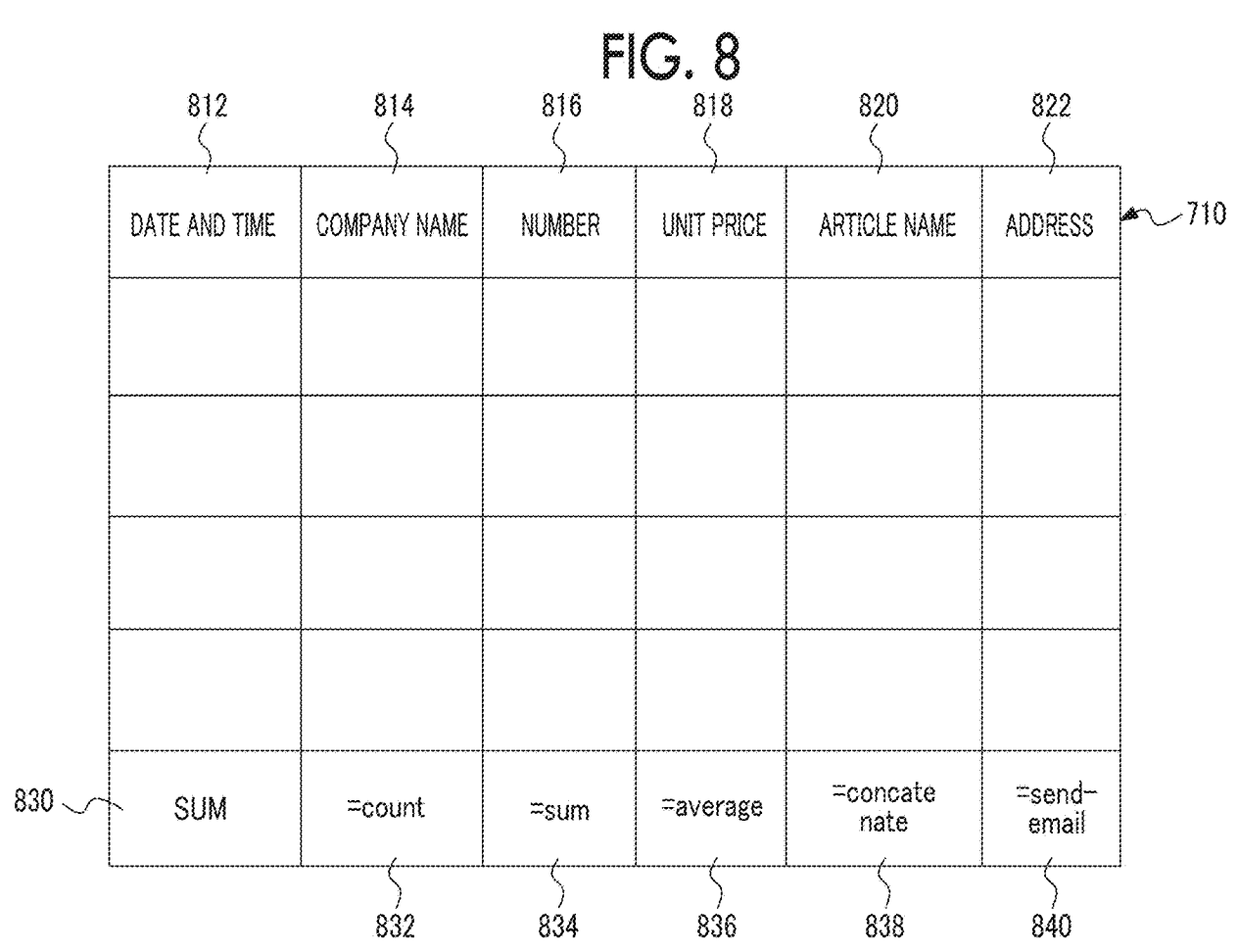

| DATE AND TIME | COMPANY NAME | NUMBER | UNIT PRICE | ARTICLE NAME | ADDRESS |
|---|---|---|---|---|---|
| 812 | 814 | 816 | 818 | 820 | 822 ←710 |
| | | | | | |
| | | | | | |
| | | | | | |
| SUM | =count | =sum | =average | =concatenate | =send-email |
| 830 | 832 | 834 | 836 | 838 | 840 |

FIG. 9

| DATE AND TIME | COMPANY NAME | NUMBER | UNIT PRICE | ARTICLE NAME | ADDRESS |
|---|---|---|---|---|---|
| 2015/3/10 | A COMPANY | 10 | | MANDARIN ORANGE | |
| 2015/3/11 | B COMPANY | | 100 | APPLE | a@b.c.def |
| 2015/3/12 | | 30 | | | |
| 2015/3/13 | | | 300 | BANANA | |
| SUM | =count | =sum | =average | =concatenate | =send-email |

FIG. 10

| | 812 | 814 | 816 | 818 | 820 | 822 |
|---|---|---|---|---|---|---|
| 710 → | DATE AND TIME | COMPANY NAME | NUMBER | UNIT PRICE | ARTICLE NAME | ADDRESS |
| 912 | 2015/3/10 | A COMPANY | 10 (920) | 924 | MANDARIN ORANGE (932) | |
| 914 | 2015/3/11 | B COMPANY | 922 928 | 100 | APPLE | a@b.c.def (938) |
| 916 | 2015/3/12 | | 30 | 926 | 934 | |
| 918 | 2015/3/13 | | 930 | 300 | BANANA (936) | |
| 830 | SUM | 2 | 40 | 200 | MANDARIN ORANGE, APPLE, BANANA | |
| | | 832 | 834 | 836 | 838 | 840 |

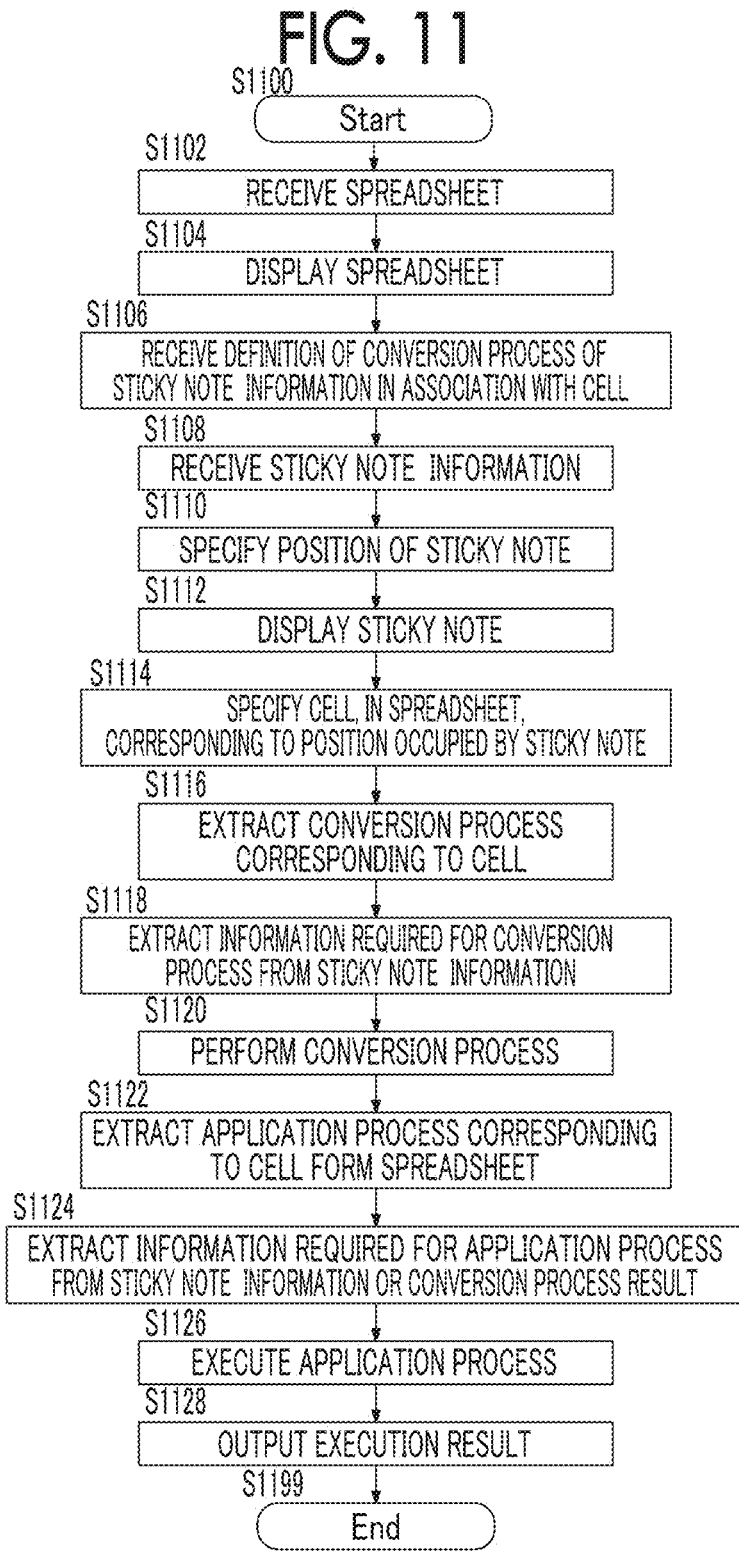

FIG. 13

| DATE AND TIME | COMPANY NAME 920 | NUMBER 1310 | UNIT PRICE | ARTICLE NAME | ADDRESS |
|---|---|---|---|---|---|
| 2015/3/10 | A COMPANY | 10 | 924 | MANDARIN ORANGE | 932 938 |
| 2015/3/11 | B COMPANY | 922 928 | 100 | APPLE | a@b.c.def |
| 2015/3/12 | | 30 | 926 | 934 | |
| 2015/3/13 | | 930 | 300 | BANANA 936 | |
| SUM | 2 | 40 | 200 | MANDARIN ORANGE, APPLE, BANANA | |

FIG. 14

| DATE AND TIME | COMPANY NAME 920 | NUMBER | UNIT PRICE | ARTICLE NAME | ADDRESS |
|---|---|---|---|---|---|
| 2015/3/10 | A COMPANY | 10  20 | 924  1412 | MANDARIN ORANGE | |
| 2015/3/11 | B COMPANY | 922  1414 | 100  200 | APPLE | a@b.c.def |
| 2015/3/12 | | 30 | | 934 | |
| 2015/3/13 | | 930 | 300 | BANANA | |
| SUM | 2 | 60 | 300 | MANDARIN ORANGE, APPLE, BANANA | |

FIG. 17

| 1710 | 1715 | 1720 | 1725 | 1730 | 1735 | 1740 |
|---|---|---|---|---|---|---|
| STICKY NOTE ID | TARGET SPREADSHEET ID | ATTACHMENT POSITION | SIZE | CORRESPONDING CELL | CREATION DATE AND TIME | CREATOR |
| F0001 | S0001 | (100, 200) | (10, 5) | (3, 5) | | KF |

1700

| 1745 | 1750 | 1755 | 1760 | 1765 | 1770 | 1775 |
|---|---|---|---|---|---|---|
| COLOR | GRID-LINE SHAPE | GRID-LINE COLOR | GRID-LINE THICKNESS | BELONGED GROUP | CONTENT CLASSIFICATION | CONTENT |
| | | | | | TEXT | |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-220194 filed Nov. 10, 2015.

BACKGROUND

Technical Field

The present invention relates to an information processing apparatus, an information processing method, and a non-transitory computer readable medium.

SUMMARY

According to an aspect of the invention, an information processing apparatus includes a first specifying unit, a second specifying unit, an extraction unit, a processing unit, and an output unit. The first specifying unit specifies a position of a sticky note attached onto a sheet having plural cells. The second specifying unit specifies at least one of the cells in the sheet based on the position. The extraction unit extracts at least one of a rule related to the position and a rule related to the at least one cell. Both of the rules define (1) how to extract information from the sticky note, and (2) how to process the extracted information. The processing unit extracts information from the sticky note according to the rule extracted by the extraction unit, and processes the information according to the extracted rule. The output unit outputs a processing result of the processing unit onto the sheet.

BRIEF DESCRIPTION OF THE DRAWINGS

Exemplary embodiments of the present invention will be described in detail based on the following figures, wherein:

FIGS. 2A to 2D are explanatory diagrams showing system configuration examples using the present exemplary embodiment;

FIGS. 5A to 5D are explanatory diagrams showing relevant examples of a spreadsheet processing module, an intermediate-layer processing module and a sticky note processing module;

FIG. 6 is a flowchart showing a processing example according to the present exemplary embodiment;

FIG. 8 is an explanatory diagram showing an example of a rule defined in a spreadsheet;

FIG. 9 is an explanatory diagram showing an example in which a sticky note is attached to the spreadsheet;

FIG. 10 is an explanatory diagram showing an example in which a processing result is displayed;

FIG. 11 is a flowchart showing a processing example according to the present exemplary embodiment;

FIG. 13 is an explanatory diagram showing an example in which a processing result is displayed;

FIG. 14 is an explanatory diagram showing an example in which plural sticky notes are attached in one cell;

FIG. 17 is an explanatory diagram showing a data structure example of a sticky note information table.

DETAILED DESCRIPTION

Hereinafter, an example of an exemplary embodiment for realizing the present invention will be described with reference to the drawings.

Figure 1:
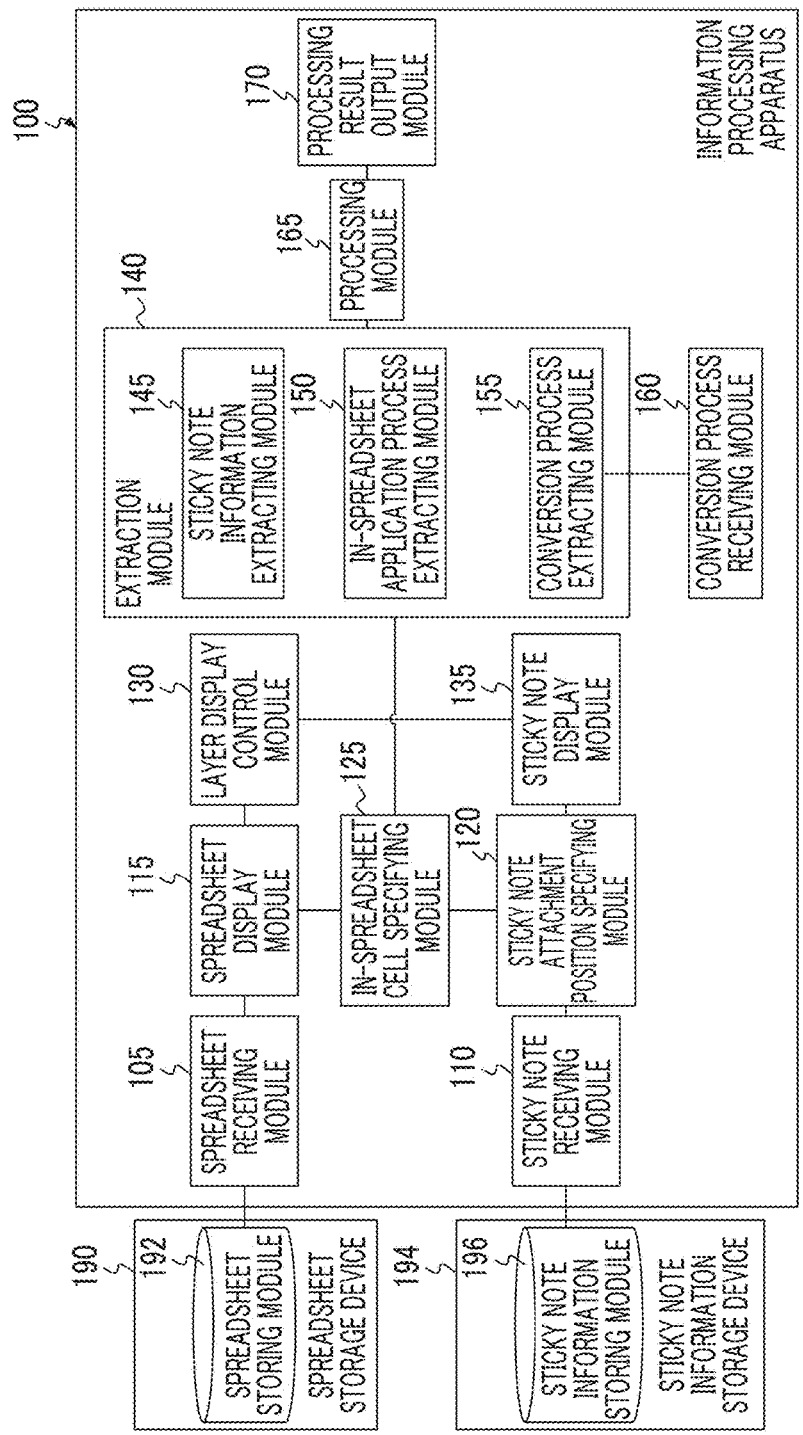
FIG. 1 is a conceptual module configuration diagram of a configuration example of an exemplary embodiment.

FIG. 1 is a conceptual module configuration diagram of a configuration example of an exemplary embodiment.

In general, a module refers to a component such as hardware or software (computer program) capable of being logically separated. Accordingly, the module in the present exemplary embodiment refers to a module in a hardware configuration in addition to a module in the computer program. Thus, the present exemplary embodiment also serves as description on computer programs (programs causing a computer to execute procedures of the modules, programs causing a computer to function as respective units, and programs causing a computer to realize respective functions) for functioning as these modules, a system and a method. For the sake of convenience in description, "store", "be stored", and their equivalent words are used, but these words mean that a program is stored in a storage device or control is performed such that a program s stored in a storage device in a case where a computer program is used in the exemplary embodiment. The modules may be in one-to-one correspondence with functions. For implementation, one module may be implemented by one program, or plural modules may be implemented by one program. One module may be realized as plural programs. Plural modules may be executed by one computer, or one module may be executed by plural computers in a distributed or parallel environment. Another module may be included in one module. Hereinafter, "connection" s used in the case of logical connection (transmission and reception of data, instruction, and reference relationship between data items in addition to physical connection. "Predetermined" means that a value is determined before a target process is performed, and includes a case where a value is determined depending on a situation or a state before a target process is performed even after the process according to the present exemplary embodiment is started as well as before the process according to the present exemplary embodiment is started or a case where a value is determined depending on a situation or a state until then. In a case where there are plural "predetermined values", different values may be used, or two or more values may be the same (of course, all the values may be the same). The description having a meaning of "B is executed in a case where A is satisfied" is used as a meaning of "it is determined whether or not A is satisfied, and B is executed in a case where it is determined that it is satisfied). However, this meaning is not applied to a case where the determination of whether or not A is satisfied is unnecessary.

A system or an apparatus may be configured such that plural computers, plural pieces of hardware, and plural apparatuses are connected via communication means such as a network (including one-to-one correspondence communication connection), or may be realized by one computer, one piece of hardware, or one apparatus. "Apparatus" and "system" are used as terms having the same meaning. Of course, the "system" does not include a social "mechanism" (social system) which is a human decision.

For each process performed by each module or each process in a case where plural processes are performed in the module, target information is read from a storage device, the process is performed, and then the processing result is written in the storage device. Accordingly, the reading from the storage device before the process is performed and the writing in the storage device after the process is performed may not be described in some cases. The storage device mentioned herein may include a hard disk, a random access memory (RAM), an external storage medium, a storage device through a communication line, and a register in a central processing unit (CPU).

An information processing apparatus 100 which is the present exemplary embodiment is an apparatus that associates processing of a sheet having plural cells with processing of sticky notes, and includes a spreadsheet receiving module 105, a sticky note receiving module 110, a spreadsheet display module 115, a sticky note attachment position specifying module 120, an in-spreadsheet cell specifying module 125, a layer display control module 130, a sticky note display module 135, an extraction module 140, a conversion process receiving module 160, a processing module 165, and a processing result output module 170, as shown in the example of FIG. 1. The "sheet having plural cells" serves as a background to which sticky notes are attached, and includes, for example, a table including rows and columns, or a business form or document including the table as a component. As a specific form, there is a spreadsheet (hereinafter, a spreadsheet is described as an example) as a table including rows and columns, which is used in spreadsheet software.

The information processing apparatus 100 uses the sticky note, and is used in a meeting (a workshop, a conference, an idea extraction meeting, or a review meeting) conducted by a facilitator (generally, one person) who leads the meeting and plural participants. The participant creates a sticky note in which an idea is described by using a terminal apparatus (sticky note information processing apparatus 210 to be described later) as a participant terminal. In general, as shown in the example of FIG. 3, as the sticky note information processing apparatus 210, there are a sticky note information processing apparatus 210A and a sticky note information processing apparatus 210B (hereinafter, referred to as the sticky note information processing apparatus 210 as a representative), and the sticky note information processing apparatus 210 are plural in number. A common sticky note information processing apparatus 200 receives the sticky note from the sticky note information processing apparatus 210, and attaches the sticky note onto the sheet. The facilitator proceeds with the meeting by determining or changing the position of the sticky note on the sheet by using a common screen which is a display device of the common sticky note information processing apparatus 200, organizing the sticky notes (referred to as associating a first sticky note with a second sticky note or group formation), or creating sticky note information for oneself. In the present exemplary embodiment, the participant includes the facilitator.

The sticky note information processing apparatus 210 includes, for example, a display device and an input device which are a touch panel type, receives an operation using a finger of the participant, or a pen, and creates the sticky note information. In addition to the touch panel, the operation may be an input using a keyboard or a mouse, a sound input using a microphone or an image input using a camera. The sticky note may have a data structure capable of managing card type information, and the content thereof may be, for example, text information, vector data indicating handwritten characters or figures, sound information, still image information such as photographs, moving image information, or combinations thereof.

The common sticky note information processing apparatus 200 attaches the sticky note transmitted from the sticky note information processing apparatus 210 onto the sheet, displays the attached sticky note, and processes the sticky note. As a person who instructs to process the sticky note, there are a facilitator and an operator of the common sticky note information processing apparatus 200.

In the meeting using the common sticky note information processing apparatus 200 and the sticky note information processing apparatus 210, in order to perform discussion, a sticky note in which text or a numeral is written is attached to a prepared template or framework, and character information or numeral information are summed up. The information processing apparatus 100 allows a user to perform the sum-up process by using a spreadsheet, and to use the sticky note for input to the spreadsheet. The information processing apparatus has a function of a kind of a front end processor (PEP) for spreadsheet software.

The spreadsheet receiving module 105 is connected to the spreadsheet display module 115 and a spreadsheet storage device 190. The spreadsheet receiving module 105 receives the spreadsheet. The spreadsheet has a table form which includes rows and columns as will be described. However, in a case where the spreadsheet displayed, the display form is not necessarily the table form, and may be, for example, a business form or a document. In the present exemplary embodiment, the spreadsheet has a function of the sheet to which the sticky notes are attached. Accordingly, the display form of the sheet may be the table form or the business form. Here, the spreadsheet being received may mean that the spreadsheet stored in a spreadsheet storing module 192 of the spreadsheet storage device 190 is read, or may mean that the spreadsheet created by the operator by using the spreadsheet software is received. The former is a case where the spreadsheet is previously created, and the spreadsheet is not necessarily created on the assumption that the sticky note is attached. Of course, the spreadsheet may be created on the assumption that the sticky note is attached.

The sticky note receiving module 110 is connected to the sticky note attachment position specifying module 120 and a sticky note information storage device 194. The sticky note receiving module 110 receives the sticky note. Here, the sticky note being received may mean that the sticky note stored in a sticky note information storing module 196 of the sticky note information storage device 194 is read, or may mean that the sticky note created by the operator by using the sticky note information processing apparatus 210 is received. The former is a case where the sticky note is previously created, and the sticky note is not necessarily created on the assumption that the sticky note is attached to the spreadsheet. Of course, the sticky note may be created on the assumption that the sticky note is attached to the spreadsheet.

For example, as the sticky note received by the sticky note receiving module 110, there is a sticky note information table 1700. FIG. 17 is an explanatory diagram showing a data structure example of the sticky note information table 1700. The sticky note information table 1700 includes a sticky note ID field 1710, a target spreadsheet ID field 1715, an attachment position field 1720, a size field 1725, a corresponding cell field 1730, a creation date and time field 1735, a creator field. 1740, a color field 1745, a grid-line shape field 1750, a grid line color field 1755, a grid-line thickness field 1760, a belonged group field 1765, a content classification field 1770, and a content field 1775. The sticky note ID field 1710 stores information (sticky note ID: IDentification) for uniquely identifying the sticky note in the present exemplary embodiment. The target spreadsheet ID field 1715 stores information (target spreadsheet ID) for uniquely identifying the spreadsheet to which the sticky note is attached in the present exemplary embodiment. Specifically, the target spreadsheet ID is an ID of the spreadsheet received by the spreadsheet receiving module 105. The attachment position field 1720 stores the attachment position of the sticky note. That is, the attachment position field stores the position of the sticky note on the sheet. For example, the attachment position is a coordinate in an XY coordinate system of the sheet. Specifically, the attachment position is a position specified by the sticky note attachment position specifying module 120. The size field 1725 stores the size of the sticky note. For example, in a case where the displayed sticky note has a rectangle shape, the size field stores the width and height of the sticky note. The corresponding cell field 1730 stores a cell, in the spreadsheet, corresponding to the attachment position of the sticky note. Specifically, the corresponding cell field stores the position (for example, a set of a row number and a column number) of the cell specified by the in-spreadsheet cell specifying module 125. The creating date and time field 1735 stores the date and time (may be year, month, date, time, minute, second, time equal to or less than a second, or combinations thereof) when the sticky note is created. The creator field 1740 stores a creator (creator ID) of the sticky note. Alternatively, the creator field may store the information processing apparatus (an apparatus ID of the common sticky note information processing apparatus 200 or the sticky note information processing apparatus 210) in which the sticky note is created. The color field 1745 stores the display color of the sticky note. The grid-line shape field 1750 stores a grid-line shape in displaying the sticky note. The grid-line color field 1755 stores the color of the grid line in displaying the sticky note. The grid-line thickness field 1760 stores the thickness of the grid line in displaying the sticky note. The belonged group field 1765 stores information regarding a group to which the sticky note belongs. For example, the belonged group field may store information indicating whether or not the sticky note belongs to a group. In a case where the sticky note belongs to the group, the belonged group field may store a group ID or another sticky note ID belonging to the group. The content classification field 1770 stores the content classification (text information, vector data indicating hand-written characters or figures, sound information, still image information such as photographs, moving image information, or information indicating combinations thereof) of the sticky note. The content field 1775 stores the content written in the sticky note.

In a state in which the sticky note is not attached to the spreadsheet which is the sheet, the target spreadsheet ID field 1715, the attachment position field 1720, and the corresponding cell field 1730 may be empty (NULL), or may be a predetermined value (default value).

The spreadsheet display module 115 is connected to the spreadsheet receiving module 105, the in-spreadsheet cell specifying module 125, and the layer display control module 130. The spreadsheet display module 115 displays the spreadsheet received by the spreadsheet receiving module 105 on a display device such as a liquid crystal display of the common sticky note information processing apparatus 200 or the sticky note information processing apparatus 210. As will be described below with reference to the example of FIG. 4, this display has a layer structure, and the spreadsheet is displayed on an indicated layer under the control of the layer display control module 130.

The sticky note attachment position specifying module 120 is connected to the sticky note receiving module 110, the in-spreadsheet cell specifying module 125, and the sticky note display module 135. The sticky note attachment position specifying module 120 attaches the sticky note received by the sticky note receiving module 110 onto the spreadsheet, which is the sheet. The attachment process may be performed in a position designated in response to the operation of the operator, or may be performed such that the sticky note is attached to a predetermined position. The sticky note attachment position specifying module 120 specifies the position of the sticky note attached on the spreadsheet. The specified position may be a position in a coordinate space of the spreadsheet, or may be a position on a screen of the display device.

The sticky note display module 135 is connected to the sticky note attachment position specifying module 120 and the layer display control module 130. The sticky note display module 135 displays the sticky note specified by the sticky note attachment position specifying module 120 on the display device such as the liquid crystal display of the common sticky note information processing apparatus 200 or the sticky note information processing apparatus 210. As will be described below with reference to the example of FIG. 4, this display has a layer structure, and the sticky note is displayed on an indicated layer under the control of the layer display control module 130.

The layer display control module 130 is connected to the spreadsheet display module 115 and the sticky note display module 135. The layer display control module 130 controls the spreadsheet display module 115 and the sticky note display module 135 to control the display of the layers. Through such control, the layers are displayed such that the sticky note is visually attached onto the spreadsheet. Specifically, the positions of the layer that displays the spreadsheet and the layer that displays the sticky note are adjusted. The positional relationship (for example, a coordinate in the other coordinate space where an origin (0, 0) in one coordinate space is positioned) between the layer that displays the spreadsheet and the layer that displays the sticky note is transmitted to the in-spreadsheet cell specifying module 125.

The in-spreadsheet cell specifying module 125 is connected to the spreadsheet display module 115, the sticky note attachment position specifying module 120, and the extraction module 140. The in-spreadsheet cell specifying module 125 specifies a cell in the spreadsheet based on the position of the sticky note specified by the sticky note attachment position specifying module 120. That is, the in-spreadsheet cell specifying module 125 specifies which cell in the spreadsheet displayed by the spreadsheet display module 115 the attachment position of the sticky note displayed by the sticky note display module 135 corresponds to. Specifically, the in-spreadsheet cell specifying module may determine a cell that overlaps the attachment position of the sticky note by using the positional relationship received from the layer display control module 130 and the areas of the respective cells in the spreadsheet. In a case where one sticky note overlaps plural cells, a cell where an upper-left corner (or may be the center) of the sticky note is positioned may be selected, or a cell having the largest overlapping area may be selected.

The layer display control module 130 is connected to the spreadsheet display module 115 and the sticky note display module 135. The layer display control module 130 allocates the display of the spreadsheet to one layer, and allocates the display of the sticky note to the other layer. Accordingly, the display control of the spreadsheet performed by the spreadsheet display module 115 and the display control of the sticky note performed by the sticky note display module 135 may be independently performed. The positional relationship between both the layers is managed, and the layers are displayed such that the sticky note is visually attached onto the spreadsheet.

The extraction module 140 includes a sticky note information extracting module 145, an in-spreadsheet application process extracting module 150, and a conversion process extracting module 155, and is connected to the in-spreadsheet cell specifying module 125 and the processing module 165. The extraction module 140 extracts information in the sticky note and a rule that defines an application process performed on the information, and transmits these information items to the processing module 165.

The sticky note information extracting module 145 extracts information from a target sticky note according to the rule extracted by the in-spreadsheet application process extracting module 150 or the conversion process extracting module 155. Specifically, the sticky note information extracting module extracts information to be defined in the rule from a spreadsheet creation screen 700.

The in-spreadsheet application process extracting module 150 extracts a rule (application process) related to the cell to which the sticky note is attached. The in-spreadsheet application process extracting module 150 extracts the rule related to the cell from the rule defined in the spreadsheet. "Information is extracted from the sticky note and the information is processed" is defined in the rule. That is, (1) target information of the sticky note to be extracted (how to extract information from the sticky note), and (2) processing content of the extracted target information (how to process the extracted information) are defined in the rule.

The conversion process receiving module 160 is connected to the conversion process extracting, module 155 of the extraction module 140. The conversion process receiving module 160 receives a rule defined in the spreadsheet displayed by the spreadsheet display module 115. In the operation of attaching the sticky note, the rule is input in response to the operation of the operator. This rule corresponds to the position, and defines, for example, a process performed on the sticky note attached to a designated area, as shown in the example of FIG. 13 to be described below.

The conversion process extracting module 155 is connected to the conversion process receiving module 160. The conversion process extracting module 155 extracts a rule (application process) related to the attachment position of the sticky note. Specifically, the conversion process extracting module 155 extracts a rule related to the position from the rule received by the conversion process receiving module 160. "Information is extracted from the sticky note and the information is processed" is defined in the rule. That is, (1) target information of the sticky note to be extracted (how to extract information from the sticky note) and (2) processing content of the extracted target information (how to process the extracted information) are defined in the rule.

The processing module 165 is connected to the extraction module 140 and the processing result, output module 170. The processing module 165 processes the information extracted from the target sticky note according to the rule extracted by the in-spreadsheet application process extracting module 150. For example, as the application process, there is a process of statistical calculation (for example, calculation of average value, maximum value, minimum value, median value, mode, or total value) with information items in the plural sticky notes as targets.

In a case where the in-spreadsheet application process extracting module 150 extracts the rule related to the cell and in a case where the conversion process extracting module 155 extracts the rule related to the position (that is, plural rules are extracted for one sticky note), the processing module 165 may preferentially apply the rule related to the position. Here, "preferentially" means that any one of (1) a method in which the rule related to the position is applied and the rule related to the cell is not applied, and (2) a method in which the rule related to the cell is applied after the rule related to the position is applied is applied.

The processing result output module 170 is connected to the processing module 165. The processing result output module 170 outputs the processing result performed by the processing module 165 onto the target spreadsheet.

The processing result output module 170 may generate a sticky note having the processing result performed by the processing module 165 as content, and may output the sticky note onto the target spreadsheet.

The spreadsheet storage device 190 includes the spreadsheet storing module 192, and is connected to the spreadsheet receiving module 105 of the information processing apparatus 100. The spreadsheet storage device 190 manages the spreadsheet in the spreadsheet storing module 192. A previously created spreadsheet is stored in the spreadsheet storing module 192.

The sticky note information storage device 194 includes the sticky note information storing module 196, and is connected to the sticky note receiving module 110 of the information processing apparatus 100. The sticky note information storage device 194 manages the sticky note in the sticky note information storing module 196. A previously created sticky note is stored in the sticky note information storing module 196.

FIGS. 2A to 2D are explanatory diagrams showing system configuration examples using the present exemplary embodiment. The common sticky note information processing apparatus 200 includes a display device generally having a large screen, and is operated by the facilitator. This display device is a device capable of being seen by all the participants. The respective sticky note information processing apparatuses 210 are operated by the participants in the meeting, and are generally possessed by the respective participants one by one. For example, a tablet-type terminal is used as the sticky note information processing apparatus 210.

In the example of FIG. 2A, the common sticky note information processing apparatus 200 includes the information processing apparatus 100. The common sticky note information processing apparatus 200, the sticky note information processing apparatus 210A, the sticky note information processing apparatus 210B, the sticky note information processing apparatus 210C, the sticky note information processing apparatus 210D and the sticky note information processing apparatus 210E are connected through a communication line 299. The communication line 299 may be a wireless line, a wired line, or a combination thereof, and may be, for example, the Internet, or an intranet as a communication infrastructure. In this case, the information processing apparatus 100 processes the spreadsheet and the sticky note displayed on the screen of the common sticky note information processing apparatus 200. The display of the screen of the common sticky note information processing apparatus 200 is transmitted to each sticky note information processing apparatus 210, and is displayed in each sticky note information processing apparatus 210.

In the example of FIG. 2B, the information processing apparatus 100, the common sticky note information processing apparatus 200, the sticky note information processing apparatus 210A, the sticky note information processing apparatus 210B, the sticky note information processing apparatus 210C, the sticky note information processing apparatus 210D and the sticky note information processing apparatus 210E are connected through the communication line 299. In this case, the common sticky note information processing apparatus 200 and the respective sticky note information processing apparatuses 210 use the information processing apparatus 100 through the communication line 299. The function of the information processing apparatus 100 may be realized as a cloud service.

In the example of FIG. 2C, each of the common sticky note information processing apparatus 200 and the sticky note information processing apparatuses 210 includes the information processing apparatus 100. The common sticky note information processing apparatus 200, the sticky note information processing apparatus 210A, the sticky note information processing apparatus 210B, the sticky note information processing apparatus 210C, the sticky note information processing apparatus 210D and the sticky note information processing apparatus 210E are connected through the communication line 299. In this case, the respective information processing apparatuses 100 process the sticky notes and the spreadsheets displayed on the screens of the respective sticky note information processing apparatuses (the common sticky note information processing apparatus 200 and the respective sticky note information processing apparatuses 210).

In the example of FIG. 2D, the common sticky note information processing apparatus 200, the sticky note information processing apparatus 210A, the sticky note information processing apparatus 210B and the sticky note information processing apparatus 210C are provided in a meeting room 280, and a meeting is conducted. The common sticky note information processing apparatus 200, the sticky note information processing apparatus 210A, the sticky note information processing apparatus 210B, and the sticky note information processing apparatus 2100 are connected through the communication line 299.

The information processing apparatus 100, the spreadsheet storage device 190, the sticky note information storage device 194, and devices in the meeting room 280 are connected to a communication line 298. The communication line 298 may be a wireless line, a wired line, or a combination thereof, and may be, for example, the Internet, or an intranet as a communication infrastructure. The functions of the information processing apparatus 100, the spreadsheet storage device 190 and the sticky note information storage device 194 may be realized as cloud services. In this case, the common sticky note information processing apparatus 200 may transmit the display of the screen of the common sticky note information processing apparatus 200 to the respective sticky note information processing apparatuses 210 by using the information processing apparatus 100, and may display the screen on the respective sticky note information processing apparatuses 210. The common sticky note information processing apparatus 200 and the respective sticky note information processing apparatuses 210 may use the information processing apparatuses 100.

Figure 3A:
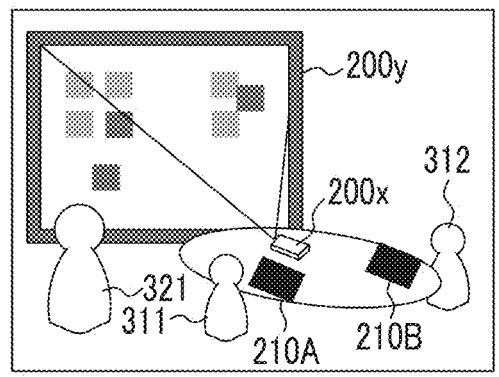
FIGS. 3A to 3C are explanatory diagrams showing use examples of a common sticky note information processing apparatus and a sticky note information station processing apparatus.
Figure 3B:
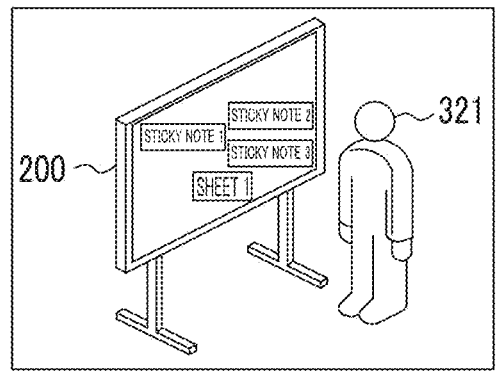
Figure 3C:
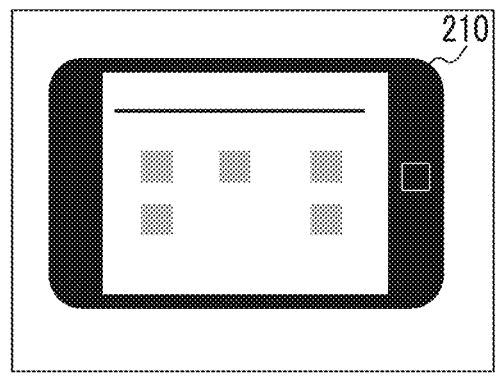

FIGS. 3A to 3C are explanatory diagrams showing examples of the meeting room according to the present exemplary embodiment and use examples of the common sticky note information processing apparatus 200 and the sticky note information processing apparatus 210.

As shown in the example of FIG. 3A, participants 311 and 312 and a facilitator 321 gather together in the meeting room. The participant 311 uses the sticky note information processing apparatus 210A, and the participant 312 uses the sticky note information processing apparatus 210B. In general, one terminal apparatus (sticky note information processing apparatus 210A) is provided to one participant, is a tablet-type apparatus having a size of a notebook (for example, A4, B5, or 7 to 10 inches) like the sticky note information processing apparatus 210 shown in the example of FIG. 3C, and is operated using a pen or a finger. Sticky note information in which text data, hand-written character, or figure is described is created by the participant. The terminal apparatus is not limited to the tablet-type apparatus, and may be a PC (including a laptop PC) including a keyboard and a mouse.

A common sticky note information processing apparatus 200x shown in the example of FIG. 3A is a projector, and displays the sheets. A common sticky note information processing apparatus 200y is an electronic whiteboard, detects the movement of the pen or the finger of the facilitator 321, and receives an operation of attaching the sticky note onto the sheet (spreadsheet), an operation of moving the sticky note, an operation of associating (grouping) the sticky notes, and an operation of creating the rule. For example, the common sticky note information processing apparatus 200y includes a pen, and receives the operations on the sheet and the sticky note by detecting the separation of this pen from a predetermined pen holder (the lifting of the pen in order for the facilitator 321 to perform the operation) and the position (the contacting of the front end of the pen with the common sticky note information processing apparatus 200y) of the front end of the pen. For example, a sensor (sensor switched on or off by gravity of the pen) may be provided in the pen holder, and may detect a pen used among plural pens (black pen, red pen and blue pen). The entire display screen of the common sticky note information processing apparatus 200y may be a touch sensor, and this touch sensor may detect the position and pressure of the pen in contact with the display screen.

The common sticky note information processing apparatus 200 may be an electronic board shown in the example of FIG. 3B. The electronic board includes a display device generally having a large size (greater than at least the display device of the sticky note information processing apparatus 210), and this display device is a touch panel and detects the position and pressure of the pen in contact with the display screen. For example, this display device may include a screen having a size of 80 inches.

Figure 4A:
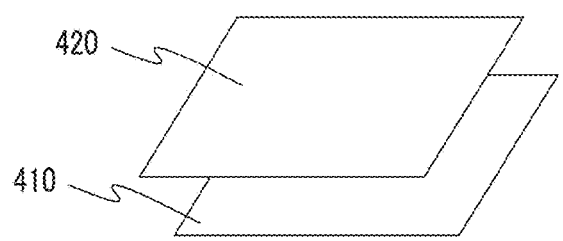
FIGS. 4A and 4B are explanatory diagrams showing a processing example of display control.
Figure 4B:
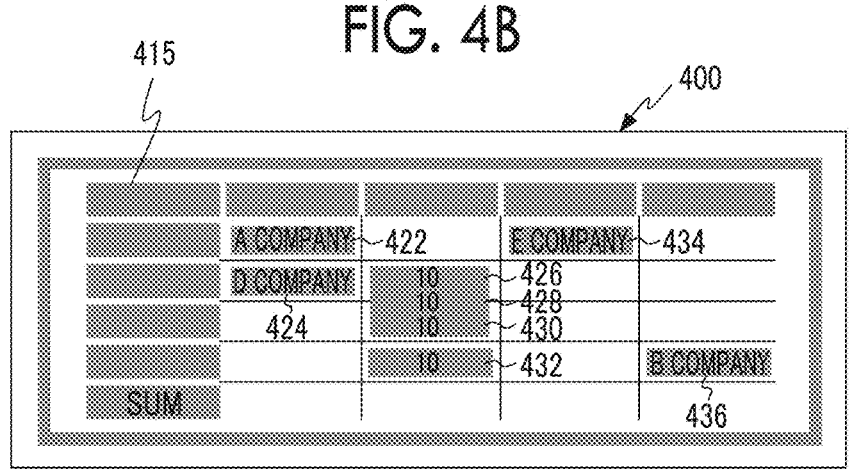

FIGS. 4A and 4B are explanatory diagrams showing a process example of the display control performed by the layer display control module 130.

As shown in the example of FIG. 4A, the layer display control module 130 creates two layers. One layer is a background layer 410 for displaying the spreadsheet (sheet), and the other layer is a sticky note layer 420 for displaying sticky notes. A display destination of the spreadsheet display module 115 is the background layer 410, and a display destination of the sticky note display module 135 is the sticky note layer 420. In general, the operation of the operator is received as an operation performed on an object (sticky note) displayed on the sticky note layer 420 with the background layer 410 as a lower layer and the sticky note layer 420 as a higher layer. Of course, a mode for receiving an operation performed on an object (spreadsheet) displayed on the background layer 410 may be prepared.

As shown in the example of FIG. 4B, sticky notes 422 to 436 are displayed on a screen 400 so as to overlap a spreadsheet 415. That is, the spreadsheet display module 115 displays the spreadsheet 415 on the background layer 410, the sticky note display module 135 displays the sticky notes 422 to 436 on the sticky note layer 420, the layer display control module 130 displays the background layer 410 and the sticky note layer 420 on the screen 400 so as to overlap each other.

FIGS. 5A to 5D are explanatory diagrams showing relevant examples of a spreadsheet processing module 510, an intermediate-layer processing module 520 and a sticky note processing module 530. The spreadsheet processing module 510 is a module that creates the spreadsheet, and the sticky note processing module 530 is a module that creates and displays the sticky note. Both modules may use existing software. The intermediate-layer processing module 520 corresponds to the information processing apparatus 100. The intermediate-layer processing module 520 serves to transmit and receive data between the spreadsheet processing module 510 and the sticky note processing module 530. The intermediate-layer processing module 520 serves as a kind of a FEP of the spreadsheet processing module 510 and a back end processor of the sticky note processing module 530. Specifically, the input, by the spreadsheet processing module 510, into the cell of the spreadsheet corresponds to the attachment of the sticky note in the sticky note processing module 530.

The example shown in FIG. 5A shows a configuration in which the spreadsheet processing module 510, the intermediate-layer processing module 520 and the sticky note processing module 530 are independently provided.

The example shown in FIG. 5B shows a configuration in which a sticky note processing extension module 540 includes the intermediate-layer processing module 520 and the sticky note processing module 530 and the intermediate-layer processing module 520 and the sticky note processing module 530 are integrally provided. The entire sticky note processing extension module 540 has a function of the FEP of the spreadsheet processing module 510.

The example shown in FIG. 5C shows a configuration in which a spreadsheet processing extension module 550 includes the spreadsheet processing module 510 and the intermediate-layer processing module 520 and the spreadsheet processing module 510 and the intermediate-layer processing module 520 are integrally provided. The entire spreadsheet processing extension module 550 has a function of the back end processor of the sticky note processing module 530.

The example shown in FIG. 5D shows a configuration in which a spreadsheet and sticky note processing module 560 includes the spreadsheet processing module 510, the intermediate-layer processing module 520 and the sticky note processing module 530 and the spreadsheet processing module 510, the intermediate-layer processing module 520 and the sticky note processing module 530 are integrally provided.

FIG. 6 is a flowchart showing a process example according to the present exemplary embodiment.

In step S602, the spreadsheet receiving module 105 receives the spreadsheet.

In step S604, the spreadsheet display module 115 displays the spreadsheet.

In step S606, the sticky note receiving module 110 receives the sticky note information.

In step S608, the sticky note attachment position specifying module 120 specifies the position of the sticky note.

In step S610, the sticky note display module 135 displays the sticky note.

In step S612, the in-spreadsheet cell specifying module 125 specifies the cell, in the spreadsheet, corresponding to the position occupied by the sticky note.

In step S614, the in-spreadsheet application process extracting module 150 extracts the application process corresponding to the cell from the spreadsheet.

In step S616, the sticky note information extracting module 145 extracts information required for the application process from the sticky note information.

In step S618, the processing module 165 performs the application process. Specifically, the application process extracted in step S614 is executed on the information extracted in step S616.

In step S620, the processing result output module 170 outputs the execution result.

FIGS. 7A to 7D are explanatory diagrams showing a process example according to the present exemplary embodiment.

Figure 7A:
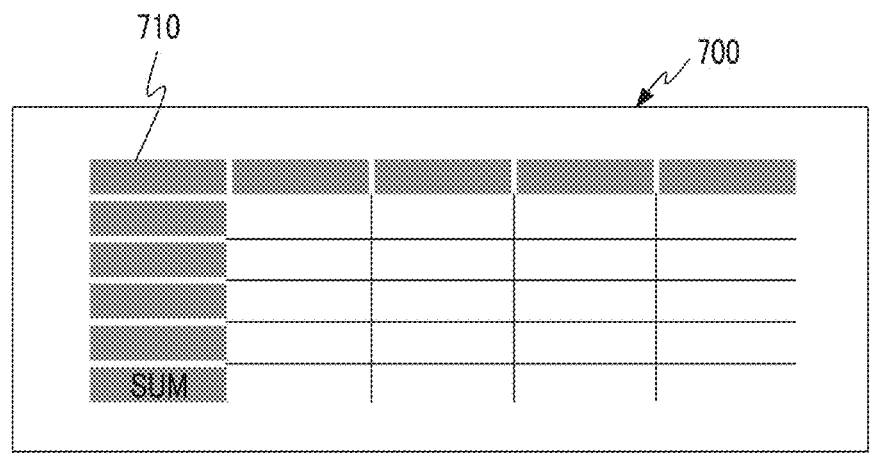
FIGS. 7A to 7D are explanatory diagrams showing a processing example according to the present exemplary embodiment.

On a spreadsheet creation screen 700 shown in the example of FIG. 7A, a spreadsheet 710 is created. The spreadsheet creation screen 700 is a screen of a password for creating the spreadsheet 710, and the spreadsheet 710 is created by spreadsheet software (or a spreadsheet service provided by the cloud service). For example, as the spreadsheet 710, a template for performing calculation using values input in cells is created. The spreadsheet creation screen 700 is generally a screen of a personal computer other than the common sticky note information processing apparatus 200 and the sticky note information processing apparatus 210, and the spreadsheet 710 is created by the personal computer. The spreadsheet 710 may be created in the common sticky note information processing apparatus 200 or the sticky note information processing apparatus 210.

The created spreadsheet 710 is stored in the spreadsheet storing module 192, and is retrieved by the spreadsheet receiving module 105.

Figure 7B:
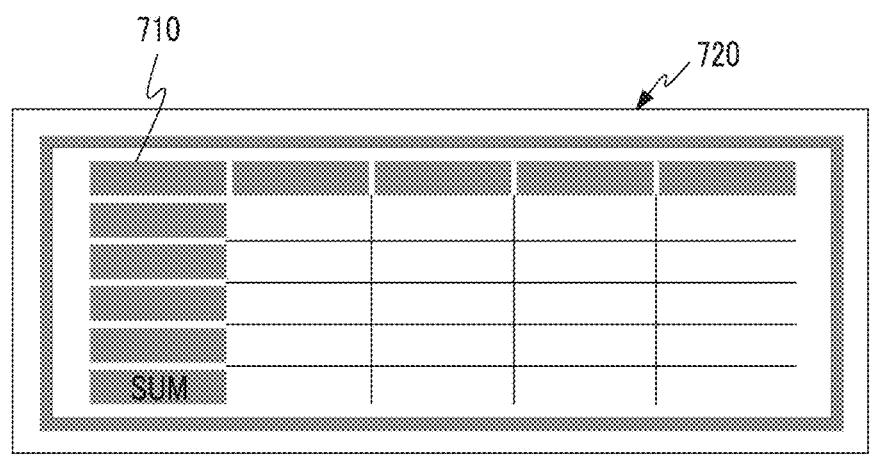

On a sticky note display screen 720 shown in the example of FIG. 7B, the spreadsheet display module 115 displays the spreadsheet 710. The sticky note display screen 720 is a display screen of the common sticky note information processing apparatus 200 or the sticky note information processing apparatus 210. For example, a Uniform Resource Locator (URL) of the spreadsheet 710 is designated, and a service capable of attaching a sticky note is started.

Figure 7C:
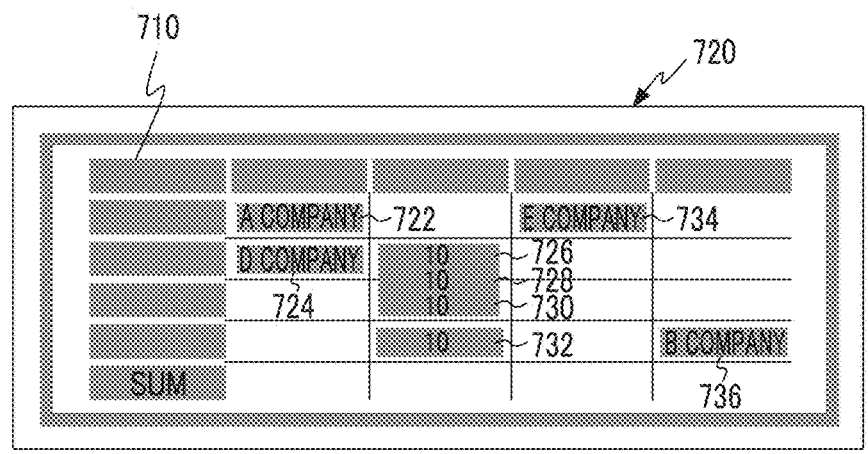

On a sticky note display screen 720 shown in the example of FIG. 7C, a sticky note 722 is attached to the spreadsheet 710 in response to the operation of the operator. That is, the sticky note is attached to the cell or the area.

Figure 7D:
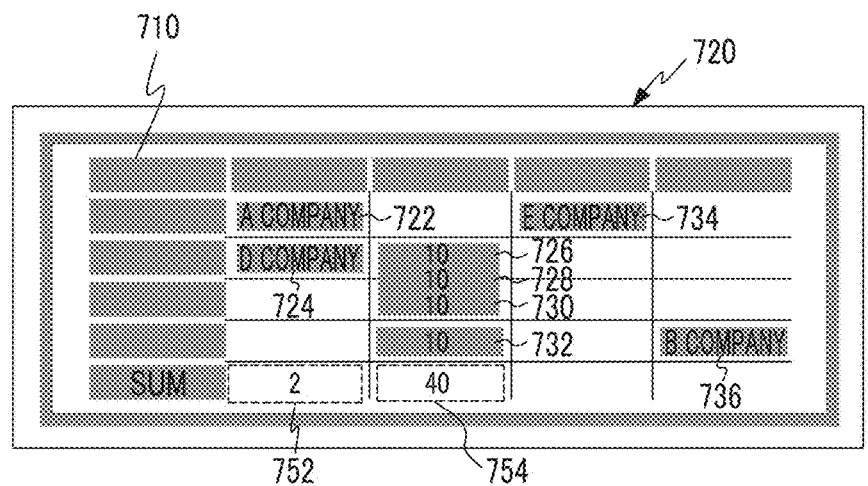

On the sticky note display screen 720 shown in the example of FIG. 7D, a sum sticky note 752 and a sum sticky note 754 are created by the process of the information processing apparatus 100, and are displayed on the positions corresponding to the cells in which the rule is described. The sum sticky note 752 is a result obtained according to the rule that counts the cells described in the second column of the spreadsheet 710, and the sum sticky note 754 is a result obtained according to the rule that sums up the values in the cells of the third column of the spreadsheet 710.

FIG. 8 is an explanatory diagram showing an example of the rule defined in the spreadsheet.

The spreadsheet 710 includes a date and time column 812, a company name column 814, a number column 816, a unit price column 818, an article name column 820, and an address column 822, and includes a sum row 830 in the bottommost row.

In a cell 832, an application process (a process of counting cells in which sticky notes are described in target cells) of "=count" for cells ((2,2), (2,3), (2,4), and (2,5)) in the company name column 814 is defined.

In a cell 834, an application process (a process of summing up values in target cells) of "=sum" for cells ((3,2), (3,3), (3,4), and (3,5)) in the number column 816 is defined.

In a cell 836, an application process (a process of averaging values in target, cells) of "=average" for cells ((4,2), (4,3), (4,4) and (4,5)) in the unit price column 818 is defined.

In a cell 838, an application process (a process of concatenating character strings in target cells) of "=concatenate" for cells ((5,2), (5,3), (5,4), and (5,5)) in the article name column 820 is defined.

In a cell 840, an application process (a process of sending a mail to an address of the mail with character strings in target cells as mail addresses) of "=send-email" for cells ((6,2), (6,3), (6,4), and (6,5)) in the address column 822 is defined.

These definitions are defined in the spreadsheet 710, and are defined by existing spreadsheet software.

FIG. 9 is an explanatory diagram showing an example in which sticky notes (sticky notes 912 to 938) are attached to the spreadsheet 710.

For example, since the sticky note 920 and the sticky note 922 are attached to cells (2,2) and (2,3), the definition of the cell 832 is executed. The execution result will be described with reference to the example of FIG. 10.

If the sticky note is moved from the current position (cell) to another position (cell), information (post process) indicating removal is input in the cell of the current position, and the information in the sticky note is input in the cell of the new position.

FIG. 10 is an explanatory diagram, showing an example in which the processing result is displayed.

"2" is displayed in the cell 832 according to the definition of "=count". Since the sticky note 920 and the sticky note 922 are attached to the cells (2,2) and (2,3), the displayed value represents a result obtained by counting the number of cells.

"40" is displayed in the cell 834 according to the definition of "=sum". Since the sticky note 924 and the sticky note 926 are attached to the cells (3,2) and (3,4), the displayed value represents a result obtained by summing the described values "10" and "30".

"200" is displayed in the cell 836 according to the definition of "=average". Since the sticky note 928 and the sticky note 930 are attached to the cells (4,3) and (4,5), the displayed value represents a result obtained by calculating an average value of the described values "100" and "300".

"Mandarin orange, apple, and banana" are displayed in the cell 838 according to the definition of "=concatenate". Since the sticky note 932, the sticky note 934 and the sticky note 936 are attached to the cells (5,2), (5,3) and (5,5), the displayed values represent a result obtained by concatenating the character strings of the described values "mandarin orange, apple, and banana".

An electronic maid is transmitted to a@b.c.def which is a character string in the sticky note 938 according to the definition of "=send-email" of the cell 840.

FIG. 11 is a flowchart showing a process example according to the present exemplary embodiment. A process example in a case where the rule (conversion process in the flowchart of FIG. 11) related to the position in addition to the rule (application process, and the definition in the spreadsheet) related to the cell is defined is illustrated. The processes of steps S1106, S1116, S1118 and S1120 are added to the flowchart shown in the example of FIG. 6.

In step S1102, the spreadsheet receiving module 105 receives the spreadsheet.

In step S1104, the spreadsheet display module 115 displays the spreadsheet.

In step S1106, the conversion process receiving module 160 receives the definition of the conversion process of the sticky note information in association with the cell.

In step S1108, the sticky note receiving module 110 receive the sticky note information.

In step S1110, the sticky note attachment position specifying module 120 specifies the position of the sticky note.

In step S1112, the sticky note display module 135 displays the sticky note.

In step S1114, the in-spreadsheet cell specifying module 125 specifies the cell, in the spreadsheet, corresponding to the position occupied by the sticky note.

In step S1116, the conversion process extracting module 155 extracts the conversion process corresponding to the cell.

In step S1118, the conversion process extracting module 155 extracts information required for the conversion process from the sticky note information.

In step S1120, the conversion process is performed.

In step S1122, the in-spreadsheet application process extracting module 150 extracts the application process corresponding to the cell from the spreadsheet.

In step S1124, the sticky note information extracting module 145 extracts information required from the application process from the sticky note information or the conversion process result.

In step S1126, the processing module 165 executes the application process.

In step S1128, the processing result output module 170 outputs the execution result. In the same cell, in the case where the conversion process and the application process are extracted, the processes of steps S1122 to S1126 may not be performed.

FIGS. 12A to 12E are explanatory diagrams showing a process example (a process example according to the flowchart shown in the example of FIG. 11) according to the present exemplary embodiment.

Figure 12A:
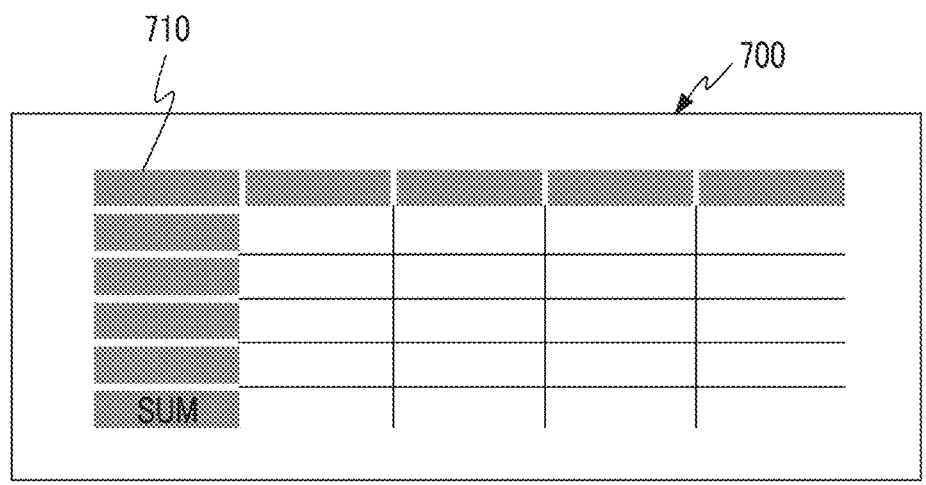
FIGS. 12A to 12E are explanatory diagrams showing a processing example according to the present exemplary embodiment.
Figure 12B:
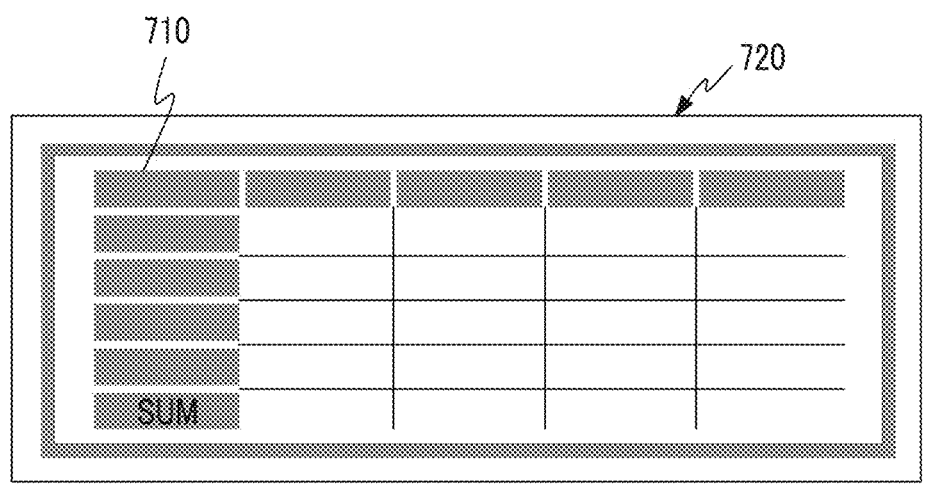
Figure 12C:
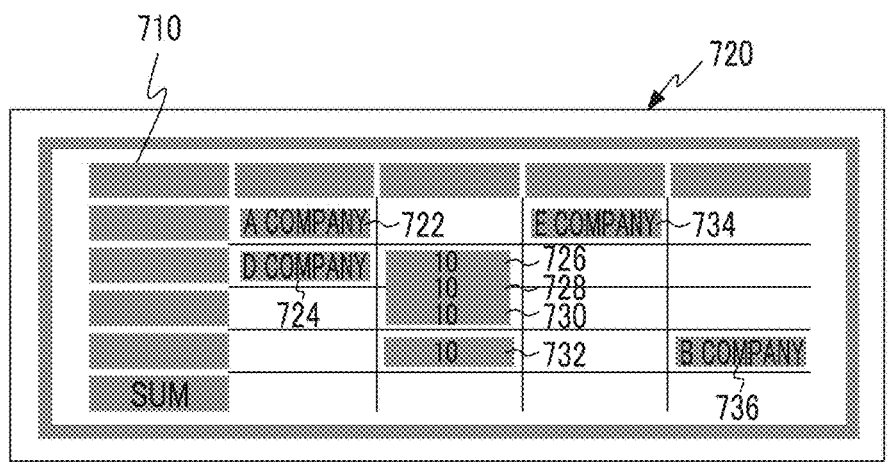

The examples shown in FIGS. 12A to 12C are the same as the examples shown in FIGS. 7A to 7C.

Figure 12D:
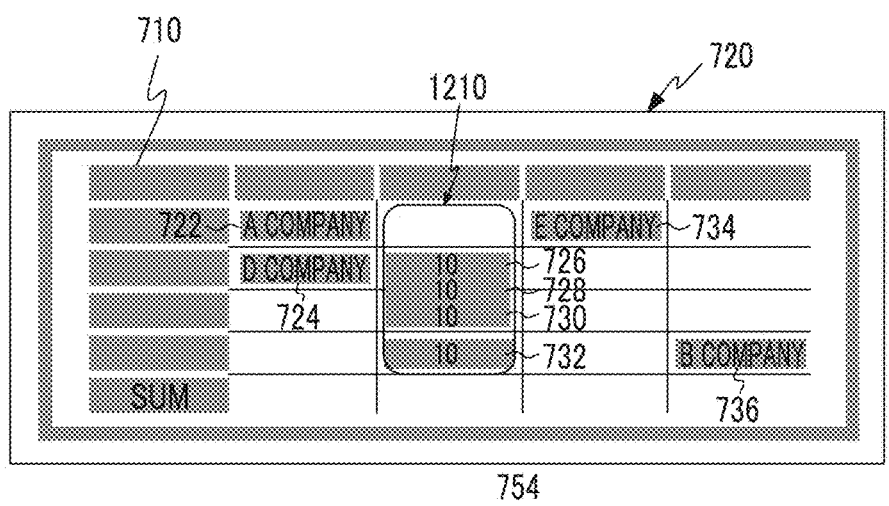

On the sticky note display screen 720 shown in the example of FIG. 12D, a definition area 1210 is designated in the state of the sticky note display screen 720 shown in FIG.

12C in response to the operation of the operator, and the conversion process on the cell in the definition area 1210 is defined.

In the examples of FIGS. 12A to 12E, the conversion process in which "the summed value of the sticky notes in the definition area 1210 is calculated and is input in the cell under the definition area 1210" is defined.

Figure 12E:
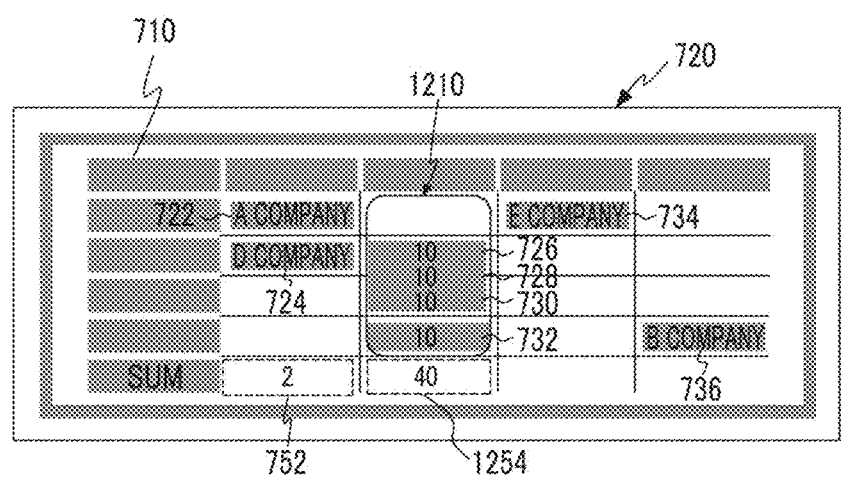

On the sticky note display screen 720 shown in FIG. 12E, the sum sticky note 752 and a sum sticky note 1254 are created by the process of the information processing apparatus 100, and are displayed in the positions corresponding to the cells in which the rule is described. Similar to the example of FIG. 7, the sum sticky note 752 represents a result obtained according to the rule that counts the cells described in the second column of the spreadsheet 710, and the sum sticky note 1254 represents a result obtained according to the rule that sums up the values in the cells of the third column of the spreadsheet 710.

FIG. 13 is an explanatory diagram showing an example in which the processing result is displayed.

A definition area 1310 is generated in response to the operation of the operator. However, the areas may be designated so as to correspond to the cells in the spreadsheet 710. Specifically, the areas may be designated along the boundary of the cells. Accordingly, even though an operation of setting the area such that the cell is traversed is performed, it is possible to set the area corresponding to the cell.

For example, even in a case where there is not the application process defined in the cell 834 shown in FIG. 8, it is possible to perform definition without adding the definition in the spreadsheet (that is, without performing an operation of displaying and modifying the spreadsheet) by defining in the definition area 1310.

The conversion process in which "the summed value of the sticky notes in the definition area 1310 is calculated and is input in the cell under the definition area 1310" is defined in the definition area 1310. As a result, "40" is displayed in the cell 834. The cell 832 and the other cells are the same as those in the example of FIG. 10.

FIG. 14 is an explanatory diagram showing an example in which the plural sticky notes are attached to one cell. Two sticky notes of a sticky note 924 and a sticky note 1412 are attached to a cell (3,2), and two sticky notes of a sticky note 928 and a sticky note 1414 are attached to a cell (4,3). The plural sticky notes may be attached so as to overlap one another.

As described above, in a case where it is detected that the plural sticky notes are attached to one cell, a predetermined process is performed on information items in these sticky notes, and the processing result is input in this cell. Here, for example, as the "predetermined process", an addition process may be performed in a case where the described contents in the sticky notes are values, and a concatenation process may be performed in a case where the described contents in the sticky notes are text. "30" is input in the cell (3,2) and "300" is input in the cell (4,3) through the "predetermined process". Since the cell 834 represents a result of the sum-up process, a process of (("10"+"20")+"30") may be performed. Since the cell 836 represents the calculation of the average value and the number of cells is 2, a process of (("100"+"200")+"300")/2 may be performed.

Figure 15A:
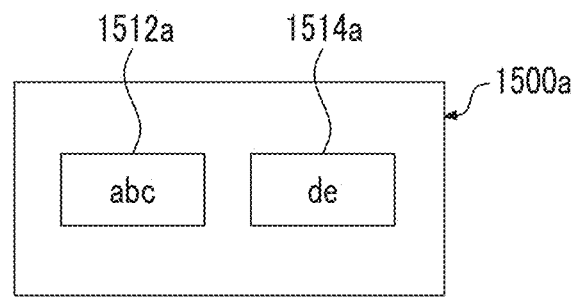
FIGS. 15A and 15B are explanatory diagrams showing an example in which plural sticky notes are attached in one cell.
Figure 15B:
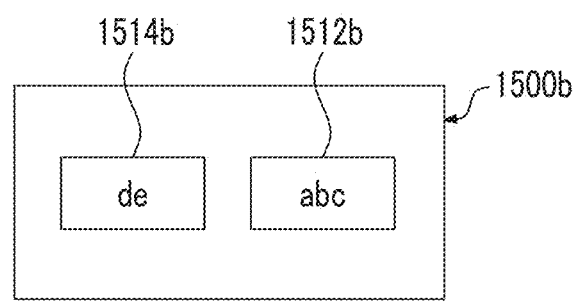

FIGS. 15A and 15B are explanatory diagrams showing an example in which the plural sticky notes are attached to one cell. An example in which the described content in the sticky note is text is illustrated.

For example, in a case where the described content in the sticky note is text, the concatenation process is performed, but the concatenation order may be determined by the positions of the sticky notes in the cell, or may be determined by attaching order of the sticky notes. Specifically, as the process of determining the concatenation order by the positions of the sticky notes in the cell, the sticky notes may be concatenated in the attachment positions of the sticky notes in order from the left. In the case of the example of FIG. 15A, since a sticky note 1512a in which a text string "abc" is described is present on the left and a sticky note 1514a in which a text string "de" is described is present on the right, a character string "abcde" is input in a cell 1500a. In the case of the example of FIG. 15B, since a sticky note 1514b in which a text string "de" is described is present on the left and a sticky note 1512b in which a text string "abc" is described is present on the right, a character string "deabc" is input in a cell 1500b. As the process of determining the concatenation order by attaching order of the sticky notes, the sticky notes may be concatenated in order from the earliest date and time when the sticky note is attached.

Figure 16A:
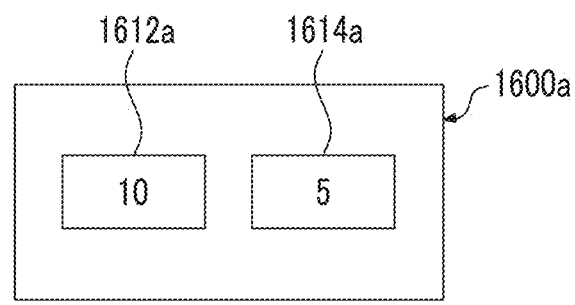
FIGS. 16A to 16C are explanatory diagrams showing examples in which plural sticks notes are attached in one cell.
Figure 16B:
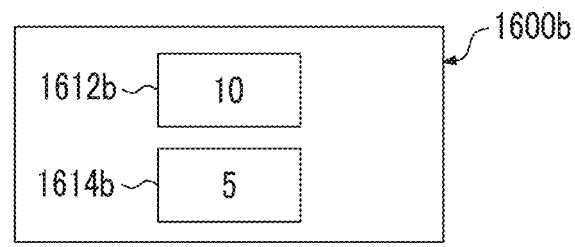
Figure 16C:
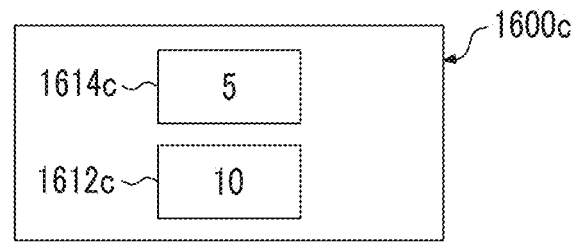

FIGS. 16A to 16C are explanatory diagrams showing examples in which the plural sticky notes are attached to one cell. An example in which the described content in the sticky note is a value is illustrated.

In the example of FIG. 14, in a case where the plural cells are present in one cell, the example in which the values are added is illustrated, but the process may be different depending on the positional relationship between the sticky notes in the cell. Specifically, the addition process may be performed in a case where the sticky notes are horizontally arranged, and a division process may be performed in a case where the sticky notes are vertically arranged. In the case of the division process, the division process is performed with the sticky note positioned on the upper side as a numerator and the sticky note positioned on the lower side as a denominator (the same positional relationship as a fraction). For example, in the case of FIG. 16A, since a sticky note 1612a in which a value of "10" is described and a sticky note 1614a in which a value of "5" is described are horizontally arranged, the addition process is applied, and a value of "15 (10+5)" is input in a cell 1600a. In the case of FIG. 16B, since a sticky note 1612b in which a value of "10" is described and a sticky note 1614b in which a value of "5" is described are vertically arranged, the division process is applied, and a value of "2 (10/5)" is input in a cell 1600b. In the case of FIG. 16C, since a sticky note 1614c in which a value of "5" is described and a sticky note 1612c in which a value of "10" is described are vertically arranged, the division process is applied, and a value of "0.5 (5/10)" is input in a cell 1600c.

It has been described that the concatenation process, the addition process and the division process are performed, but other processes (a subtraction process, a multiplication process, an averaging process, a comma-separated values (CSV) process, an arranging process, and a sticky note group forming process) may be performed. These values (the processing content, the positional relationship between the sticky notes or attaching order) may be defined as a default, or may be defined in the definition area 1310 shown in the example of FIG. 13.

Figure 18:
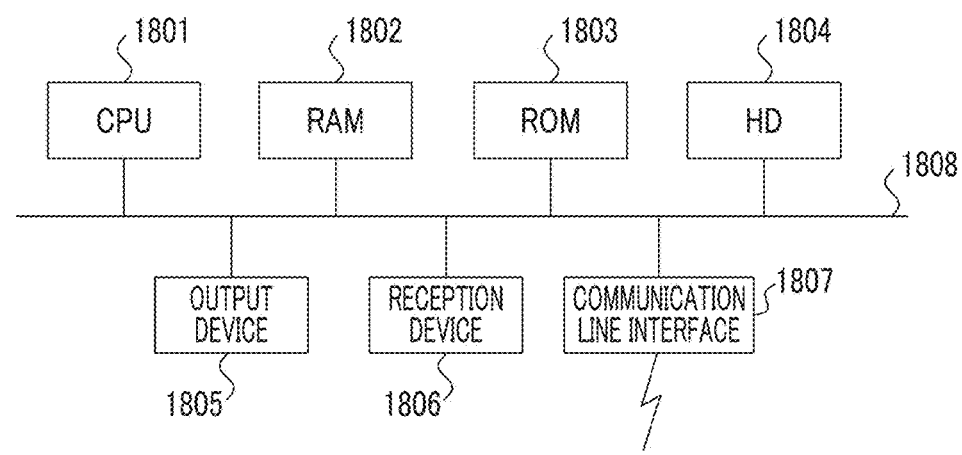
FIG. 18 is a block diagram showing a hardware configuration example of a computer that implements the present exemplary embodiment.

As shown in the example of FIG. 18, a hardware configuration of a computer that executes a program as the present exemplary embodiment is a general computer, and specifically, is a personal computer, or a computer capable of serving as a server. That is, as a specific, example, a CPU 1801 is used as a processing unit (calculating unit), and a RAM 1802, a ROM 1803, and a HD 1804 are used as the storage devices. For example, a hard disk and a solid state drive (SSD) may be used as the HD 1804. The computer includes the CPU 1801 that executes programs such as the spreadsheet receiving module 105, the sticky note receiving module 110, the spreadsheet display module 115, the sticky note attachment position specifying module 120, the in-spreadsheet cell specifying module 125, the layer display control module 130, the sticky note display module 135, the extraction module 140, the sticky note information extracting module 145, the in-spreadsheet application process extracting module 150, the conversion process extracting module 155, the conversion process receiving module 160, the processing module 165 and the processing result output module 170, the RAM 1802 that stores programs and data, the ROM 1803 that stores programs for starting the computer, the HD 1804 which is an auxiliary storage device (may be a flash memory), a reception device 1806 that receives data based on the operation of the user using a keyboard, a mouse, a touch panel, or a microphone, an output device 1805 such as a CRT, a liquid crystal display or a speaker, a communication line interface 1807 for connecting with a communication network such as a network interface card, and a bus 1808 that connects these components to transmit and receive data. This computer may be plural in number, and the plural computers may be connected to one another via a network.

Among the above-described exemplary embodiments, the exemplary embodiment in the form of the computer program is realized by causing the system having the present hardware configuration to read a computer program which is software and causing the software resources and the hardware resources to cooperate.

The hardware configuration shown in FIG. 18 is merely one configuration example. The present exemplary embodiment is not limited to the configuration shown in FIG. 18 and may be a configuration in which the modules described in the present exemplary embodiment are be executed. For example, the present exemplary embodiment may have a configuration in which some of the modules are realized as a dedicated hardware (for example, application specific integrated circuit (ASIC)), may have a configuration in which some of the modules are present in an external system and are connected through a communication line, or may have a configuration in which the system shown in FIG. 18 is plural in number, and the plural systems are connected to one another through a communication line and are in cooperation with one another. Particularly, the above-described exemplary embodiment may be incorporated into portable information communication devices (including a portable phone, a smart phone, a mobile device, and a wearable computer), a home information appliance, a robot, a copier, a facsimile, a scanner, a printer, or a multi function device (image processing apparatus having two or more functions of a scanner, a printer, a copier or a facsimile) in addition to the personal computer.

The described programs may be provided while being stored in a recording medium, or the programs may be provided through communication. In this case, for example, the above-described programs may be ascertained as an invention of a "computer readable recording medium storing a program".

The "computer readable recording medium storing a program" refers to a computer readable recording medium storing a program which is used to install, execute and distribute a program.

For example, the recording medium includes a digital versatile disc (DVD) such as "DVD-R, DVD-RW or DVD-RAM" which is a standard developed in a DVD forum, or "DVD+R or DVD+RW" which is a standard developed in a DVD+RW, a compact disc (CD) such as a read only memory (CD-ROM), a CD recordable (CD-R) or a CD rewritable (CD-RW), a Blu-ray (registered trademark) disc, a magneto-optic disk (MO), a flexible disk (FD), a magnetic tape, a hard disk, a read only memory (ROM), electrically erasable programmable read only memory (EEPROM (registered trademark)) a flash memory, a random access memory (RAM), and a Secure Digital (SD) memory card.

The programs or some thereof may be reserved or distributed while being recorded in the recording medium. For example, the programs may be transmitted through communication using a wired network used in a local area network (LAN), a metropolitan area network (MAN), a wide area network (WAN), the Internet, an internet or an extranet, a wireless network, or a transmission medium such as a combination thereof, or may be transmitted through a carrier wave.

The programs may be a part of another program, or may be recorded in a recording medium together with individual programs. The programs may be separately recorded in plural recording media. The programs may be recorded in any restoration forms such as compression or encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
one or more processors programmed to
specify an x,y coordinate position of a sticky note attached onto a sheet having a plurality of cells,
specify at least one of the cells in the sheet based on the specified x,y coordinate position,
extract at least one of a rule related to the specified x,y coordinate position and a rule related to the at least one specified cell, both of the rules defining (1) how to extract information from the sticky note, and (2) how to process the extracted information,
extract information from the sticky note according to the extracted rule,
process the information according to the extracted rule, and
output a processing result onto the sheet, wherein
the one or more processors are further programmed to preferentially apply the rule related to the specified x,y coordinate position in a case where both the rule related to the specified cell and the rule related to the specified x,y coordinate position are extracted.

2. The information processing apparatus according to claim 1, wherein
both of the rules define a statistical calculation as how to process the extracted information.

3. The information processing apparatus according to claim 1, wherein the one or more processors are further programmed to extract the rule related to the at least one specified cell from a rule defined in the sheet.

4. The information processing apparatus according to claim 1, wherein
the one or more processors are further programmed to receive a rule defined in the sheet displayed, and extract the rule related to the specified x,y coordinate position from the received rule.

5. The information processing apparatus according to claim 3, wherein
the one or more processors are further programmed to receive the rule defined in the sheet displayed, and extract the rule related to the specified x,y coordinate position from the received rule.

6. The information processing apparatus according to claim 1, wherein
the one or more processors are further programmed to generate a sticky note having the processing result as content, and output the sticky note on the sheet.

7. The information processing apparatus according to claim 3, wherein
the one or more processors are further programmed to generate a sticky note having the processing result as content, and output the sticky note on the sheet.

8. The information processing apparatus according to claim 4, wherein
the one or more processors are further programmed to generate a sticky note having the processing result as content, and output the sticky note on the sheet.

9. The information processing apparatus according to claim 5, wherein
the one or more processors are further programmed to generate a sticky note having the processing result as content, and output the sticky note on the sheet.

10. An information processing method comprising:
specifying an x,y coordinate position of a sticky note attached onto a sheet having a plurality of cells;
specifying at least one of the cells in the sheet based on the specified x,y coordinate position;
extracting at least one of a rule related to the specified x,y coordinate position and a rule related to the at least one specified cell, both of the rules defining (1) how to extract information from the sticky note, and (2) how to process the extracted information;
extracting information from the sticky note according to the extracted rule;
processing the information according to the extracted rule; and
outputting a result of the processing onto the sheet, wherein
the rule related to the specified x,y coordinate position is preferentially applied in a case where both the rule related to the specified cell and the rule related to the specified x,y coordinate position are extracted.

11. A non-transitory computer readable medium storing a program causing a computer to execute information processing, the information processing comprising:
specifying an x,y coordinate position of a sticky note attached onto a sheet having a plurality of cells;
specifying at least one of the cells in the sheet based on the specified x,y coordinate position;
extracting at least one of a rule related to the specified x,y coordinate position and a rule related to the at least one specified cell, both of the rules defining (1) how to extract information from the sticky note, and (2) how to process the extracted information;
extracting information from the sticky note according to the extracted rule;
processing the information according to the extracted rule; and
outputting a result of the processing onto the sheet, wherein
the rule related to the specified x,y coordinate position is preferentially applied in a case where both the rule related to the specified cell and the rule related to the specified x,y coordinate position are extracted.

\* \* \* \* \*